United States Patent
Nagai et al.

(10) Patent No.: US 7,892,999 B2
(45) Date of Patent: Feb. 22, 2011

(54) FLOAT GLASS FOR DISPLAY SUBSTRATE AND METHOD FOR PRODUCING IT

(75) Inventors: Kensuke Nagai, Chiyoda-ku (JP); Tetsuya Nakashima, Chiyoda-ku (JP); Kei Maeda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 58 days.

(21) Appl. No.: 12/267,638

(22) Filed: Nov. 10, 2008

(65) Prior Publication Data

US 2009/0137379 A1 May 28, 2009

Related U.S. Application Data

(63) Continuation of application No. PCT/JP2007/059623, filed on May 9, 2007.

(30) Foreign Application Priority Data

May 10, 2006 (JP) .............................. 2006-131971

(51) Int. Cl.
*C03C 3/083* (2006.01)
*C03C 3/085* (2006.01)
*C03C 3/087* (2006.01)
*C03C 3/078* (2006.01)

(52) U.S. Cl. .............................. 501/70; 501/68; 501/69; 501/72

(58) Field of Classification Search ............. 501/68–70, 501/72

See application file for complete search history.

(56) References Cited

U.S. PATENT DOCUMENTS

| 5,900,296 | A | * | 5/1999 | Hayashi et al. | ............. 428/64.1 |
| 2002/0010066 | A1 | * | 1/2002 | Nakashima et al. | ........... 501/69 |
| 2008/0128923 | A1 | * | 6/2008 | Saito et al. | ................... 257/794 |

FOREIGN PATENT DOCUMENTS

| JP | 3040933 | 2/1991 |
| JP | 8133778 | 5/1996 |
| JP | 8165138 | 6/1996 |
| JP | 11322358 | 11/1999 |
| JP | 2001348246 | 12/2001 |
| JP | 2004051473 | 2/2004 |
| JP | 2005213048 | 8/2005 |

OTHER PUBLICATIONS

U.S. Appl. No. 12/437,739, filed May 8, 2009, Nagai, et al.

* cited by examiner

*Primary Examiner*—David M. Brunsman
*Assistant Examiner*—Kevin M Johnson
(74) *Attorney, Agent, or Firm*—Oblon, Spivak, McClelland, Maier & Neustadt, L.L.P.

(57) ABSTRACT

A float glass for a display substrate, characterized in that its composition consists essentially of, as represented by mass % based on oxide, from 52 to 62% of $SiO_2$, from 5 to 15% of $Al_2O_3$, from more than 0% to 9% of MgO, from 3 to 12% of CaO, from 9 to 18% of SrO, from 0 to 13% of BaO, from 25 to 30% of MgO+CaO+SrO+BaO, from 6 to 14% of $Na_2O+K_2O+Li_2O$, from 0 to 6% of $ZrO_2$ and from 0 to 1% of $SO_3$, the temperature of glass melt corresponding to the viscosity of $10^2$ dPa·s is at most 1,520° C., the temperature of glass melt corresponding to the viscosity of $10^4$ dPa·s is at most 1,120° C., the glass transition temperature is at least 610° C., and the specific gravity is at most 2.9.

10 Claims, 1 Drawing Sheet

FLOAT GLASS FOR DISPLAY SUBSTRATE AND METHOD FOR PRODUCING IT

TECHNICAL FIELD

The present invention relates to a glass for a display substrate, particularly a float glass which is preferred as a glass for a plasma display panel (hereinafter referred to as PDP) substrate and a method for producing the float glass.

BACKGROUND ART

Heretofore, PDP is generally produced by firing metal electrodes, an insulating paste, a rib paste, etc. on a substrate glass at a temperature of from about 550 to 600° C., followed by frit sealing opposed plates and its vicinity. Heretofore, in general soda lime silica glass which is widely used for buildings and automobiles has been used as a glass for a PDP substrate.

However, since the glass transition temperature of the soda lime silica glass is from 530 to 560° C., if the glass is heat-treated at the above firing temperature, the substrate glass deforms or shrinks, and the dimension remarkably changes. Therefore, it has been desired to realize positioning opposed plates and electrodes accurately. Particularly, in a case where a continuous furnace such as a belt furnace, of which productivity is high, is used, there is a problem that due to the temperature difference between the anterior and the posterior of the substrate glass, a dimensional change results such that the substrate glass becomes asymmetrical at anterior and posterior. Such a problem is remarkable in the case of a large substrate glass, for example, a 40-inch size PDP, and a substrate glass having a higher heat resistance is required.

In order to solve the problem of the heat deformation or the heat shrinkage of the substrate glass, a glass for a display substrate has been known, wherein the thermal expansion coefficient is near to that of soda lime silica glass, and the glass transition temperature and the distortion point are high (Patent Documents 1 and 2).

If such a glass is used as a glass for a PDP substrate, when the heat treatment for producing PDP is carried out in a continuous furnace, the anterior-posterior asymmetrical dimensional change, which is the problem in the soda lime silica glass, can be prevented, whereby a substrate glass can be fired highly accurately.

However, compared to the soda lime silica glass, in the glasses for display substrates described in Patent Documents 1 and 2, the viscosity of the glasses at a high temperature (for example, the viscosity of the glasses at a temperature of at least 700° C.) is high. Therefore, it is required to increase the temperature at each step carried out for producing a substrate glass, namely it is required to increase the glass melting temperature, the glass clarification temperature and the glass forming temperature, and problems result such that stable production is difficult, life span of production apparatuses is harmed, and production cost of a substrate glass is high.

Thus, it is required to lower the viscosity of glass at a high temperature for stable production of glass, the extension of life span of production apparatus, cost reduction, etc.

However, in the case of the glass composition, of which the high temperature viscosity is simply lowered, properties required for the substrate glass for PDP cannot be satisfied. Namely, properties such as the specific gravity of the substrate glass, the glass transition temperature, chemical resistance, dielectric constant, volume resistivity, reflectance, thermal expansion coefficient and distortion point cannot be satisfied within the range required for the substrate glass for PDP.

Further, in the case of the glass composition, of which the high temperature viscosity is simply lowered, the temperature of each step carried out for producing the substrate glass can be thereby lowered, however, if the temperature at the clarification step is lowered, the effect of a clarifier deteriorates. At the time of producing the glass for a display substrate, $SO_3$ is usually used as a clarifier to reduce foams (bubbles) in the glass. $SO_3$ in the form of a sulfate of an alkaline earth metal is added in a glass material. Then, $SO_3$ decomposes in molten glass, whereby $SO_2$ is generated. This $SO_2$ grows bubbles present in molten glass, whereby the clarification effect is improved. However, if the temperature at the clarification step is lowered in accordance with the composition, of which the high temperature viscosity is lowered, $SO_3$ is not likely to decompose in molten glass, and the effect of the clarifier deteriorates.

Patent Document 1: JP-A-3-40933
Patent Document 2: JP-A-8-165138

DISCLOSURE OF THE INVENTION

Object to be Accomplished by the Invention

In order to solve the above problem, it is an object of the present invention to provide a float glass for a display substrate, which is capable of lowering the high temperature viscosity, while securing properties and quality as a glass for a display substrate, particularly as a glass for PDP.

Means to Accomplish the Object

In order to accomplish the above object, the present invention provides a float glass for a display substrate, characterized in that its composition consists essentially of, as represented by mass % based on oxide, from 52 to 62% of $SiO_2$, from 5 to 15% of $Al_2O_3$, from more than 0% to 9% of MgO, from 3 to 12% of CaO, from 9 to 18% of SrO, from 0 to 13% of BaO, from 25 to 30% of MgO+CaO+SrO+BaO, from 6 to 14% of $Na_2O+K_2O+Li_2O$, from 0 to 6% of $ZrO_2$ and from 0 to 1% of $SO_3$, the temperature of glass melt corresponding to the viscosity of $10^2$ dPa·s is at most 1,520° C., the temperature of glass melt corresponding to the viscosity of $10^4$ dPa·s is at most 1,120° C., the glass transition temperature is at least 610° C., and the specific gravity is at most 2.9 (hereinafter referred to as "the substrate glass of the present invention").

The substrate glass of the present invention preferably contains from more than 0% to at most 5% of MgO, as represented by mass % based on oxide.

The substrate glass of the present invention preferably contains from at least 0.001% to less than 1% of $SO_3$, as represented by mass % based on oxide.

The substrate glass of the present invention is preferably such that the foam growth starting temperature in the glass melt is lower than 1,420° C.

The substrate glass of the present invention preferably has a thermal expansion coefficient within the range of from $80 \times 10^{-7}$/° C. to $90 \times 10^{-7}$/° C.

The substrate glass of the present invention is preferably such that the volume resistivity of the glass is at least $1 \times 10^{11}$ Ω·cm at 150° C.

Further, the present invention provides a method for producing a float glass for a display substrate, characterized in that a glass material is prepared so as to be the above glass, and the glass material is then melted and formed into a plate glass by a float process.

EFFECT OF THE INVENTION

The substrate glass of the present invention has a low viscosity at a high temperature while securing properties required for a glass for a display substrate, particularly properties required for a glass for a PDP substrate. Therefore, the temperature of each step carried out for producing the substrate glass can be lowered. Namely, the temperature of the melting step, the temperature of the clarification step and the temperature of the forming step (for example, a forming step in a float process) can be lowered.

By lowering the temperature of each step carried out for producing the substrate glass, it is possible to obtain advantages such that production becomes stable, the life span of production apparatus is extended, and the production cost of the substrate glass becomes low.

Further, by lowering the temperature of each step carried out for producing the substrate glass, it is possible to obtain the following advantages which relate to properties of the substrate glass.

By lowering the temperature at the forming step in the float process, tin defects in a substrate glass to be obtained can be reduced. If the temperature in the forming step of the float process is high, an amount of molten tin to evaporate in a float bath increases. Evaporated tin is condensed in the vicinity of the ceiling of the float bath and drops on glass ribbons, and tin defects result.

Further, in the substrate glass of the present invention, even if the temperature in the clarification step is lowered, the effect of the clarifier can be preferably elicited. As a result, it is possible to obtain a high quality substrate glass having little foam.

BEST MODE FOR CARRYING OUT THE INVENTION

Figure 1:
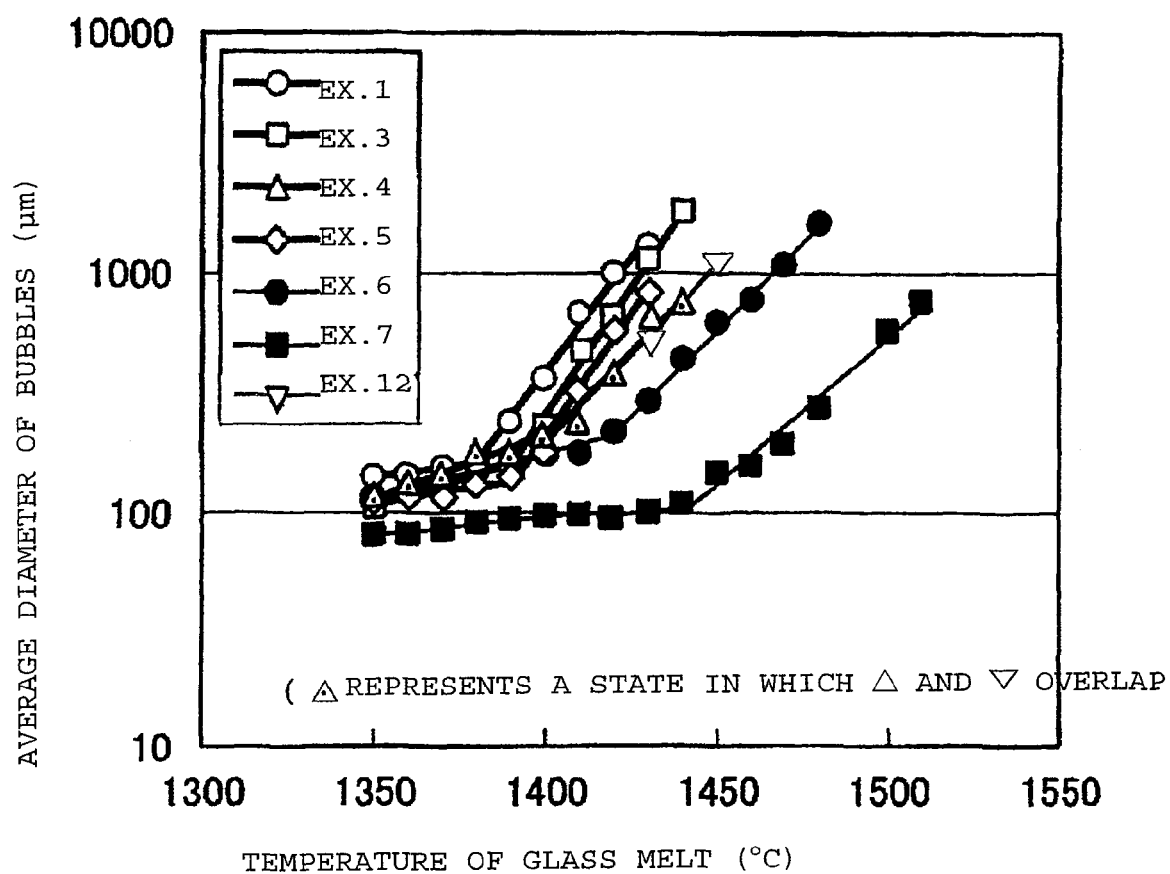
FIG. 1 is a graph which shows the relationship between the temperature of the glass melt and logarithm values of the average diameter of bubbles.

Now, the substrate glass of the present invention is further explained. Further, hereinafter, % means mass % unless otherwise specified.

The composition of the substrate glass of the present invention consists essentially of, as represented by mass % based on oxide, from 52 to 62% of $SiO_2$, from 5 to 15% of $Al_2O_3$, from more than 0% to 9% of MgO, from 3 to 12% of CaO, from 9 to 18% of SrO, from 0 to 13% of BaO, from 25 to 30% of MgO+CaO+SrO+BaO, from 6 to 14% of $Na_2O+K_2O+Li_2O$, from 0 to 6% of $ZrO_2$ and from 0 to 1% of $SO_3$.

The reason why the substrate glass of the present invention is limited to the above composition is as follows.

$SiO_2$: $SiO_2$ is a component to form a skeleton of the glass, and if the content of $SiO_2$ is less than 52%, the heat resistance of the substrate glass deteriorates. Further, the high temperature viscosity of the glass increases, and consequently the temperature of each step for producing a substrate glass cannot be lowered. On the other hand, if the content of $SiO_2$ exceeds 62%, the thermal expansion coefficient of the substrate glass is lowered.

The content of $SiO_2$ is preferably from 53 to 61%, more preferably from 54 to 60%, most preferably from 55 to 59%.

$Al_2O_3$: $Al_2O_3$ has an effect to raise the glass transition temperature and improve the heat resistance of the substrate glass, however, if the content of $Al_2O_3$ is less than 5%, the effect is subtle. On the other hand, if the content of $Al_2O_3$ exceeds 15%, the high temperature viscosity of the substrate glass becomes high, and consequently the temperature of each step for producing the substrate glass cannot be lowered.

The content of $Al_2O_3$ is preferably from 6 to 13%. The content of $Al_2O_3$ is more preferably from 6 to 11%, most preferably from 6 to 9%.

MgO: MgO is contained, since it has an effect to lower the viscosity at the time of melting the glass and improve melting. Since MgO has effects to lower the specific gravity and prevent the glass from being scratched, MgO can be contained up to 9%, when a large size substrate glass is produced.

The content of MgO is preferably from 1 to 7.5%. If the content of MgO exceeds 5%, the thermal expansion coefficient of the glass tends to be too large. Therefore, the content of MgO is more preferably from 1 to 5%. The content is further preferably from 2 to 5%, most preferably from 2 to 4%.

CaO: CaO has effects to improve the glass transition temperature, increase the thermal expansion coefficient and lower the high temperature viscosity of the glass. If the content of CaO is less than 3%, the thermal expansion coefficient of the glass tends to be too small. On the other hand, if the content is at least 12%, the thermal expansion coefficient tends to be too large.

The content of CaO is more preferably from 3 to 10%. The content of CaO is further preferably from 3 to 8%, most preferably from 3 to 6%.

SrO: Like CaO, SrO has effects to improve the glass transition temperature, increase the thermal expansion coefficient and lower the high temperature viscosity of the glass. If the content of SrO is less than 9%, the glass transition temperature tends to be too low. On the other hand, if the content exceeds 18%, the thermal expansion coefficient tends to be too large.

The content of SrO is more preferably from 10 to 17%. The content of SrO is further preferably from 10 to 16%, most preferably from 10 to 15%.

BaO: BaO can be contained, since it has effects to improve the glass transition temperature, increase the thermal expansion coefficient and lower the high temperature viscosity of the glass. However, if the content of BaO exceeds 13%, the thermal expansion coefficient of the glass tends to be too large.

If the total content of MgO, CaO, SrO and BaO is less than 25%, the high temperature viscosity of the glass tends to be too high. On the other hand, if the total content exceeds 30%, the thermal expansion coefficient tends to be too large.

The total content of MgO, CaO, SrO and BaO is preferably from 25 to 29%. The total content is more preferably from 25 to 28%, further preferably from 25 to 27%.

$Na_2O$, $Li_2O$ and $K_2O$: At least one of $Na_2O$, $Li_2O$ and $K_2O$ is essential to increase the thermal expansion coefficient of the glass. If the total content of $Na_2O$, $Li_2O$ and $K_2O$ is less than 6%, the thermal expansion coefficient of the glass tends to be too small. On the other hand, if the total content exceeds 14%, the heat resistance of the glass deteriorates.

The total content of $Na_2O$, $Li_2O$ and $K_2O$ is more preferably from 6 to 12%. The total content of $Na_2O$, $Li_2O$ and $K_2O$ is further preferably from 6 to 10%, most preferably from 6 to 8%.

Among them, the content of $K_2O$ is preferably at least 1% to increase the thermal expansion coefficient of the glass. On the other hand, if such components are excessively added, the heat resistance of the glass tends to remarkably deteriorate.

From such viewpoints, the range is preferably such that $Li_2O$ is from 0 to 1%, $Na_2O$ is from 0 to 7%, and $K_2O$ is from 1 to 6%, and the range is more preferably such that $Li_2O$ is from 0 to 1%, $Na_2O$ is from 0 to 6%, and $K_2O$ is from 1 to 5%.

$ZrO_2$: $ZrO_2$ is used to improve the heat resistance and chemical resistance of the glass. If the content of $ZrO_2$ is at least 6%, the glass tends to devitrify.

$SO_3$: $SO_3$ is usually used as a clarifier, and a part of $SO_3$ remains in the substrate glass after the production. However, if $SO_3$ is added to a glass material in such an amount that the remaining amount in the substrate glass after the production exceeds 1%, bubbles remain in the glass due to reboiling of the glass at the time of production, etc.

Further, in a case where $SO_3$ is used as a clarifier, the amount of an $SO_3$ source to be added to a glass material is preferably from 0.1 to 5% as calculated as $SO_3$, based on 100% of the glass material. In such a case, the remaining amount in the substrate glass is from 0.001% to less than 1%, preferably from 0.01% to less than 1%, more preferably from 0.01 to 0.6%, as calculated as $SO_3$.

Accordingly, a preferred composition of the substrate glass of the present invention consists essentially of, as represented by mass % based on oxide, from 53 to 61% of $SiO_2$, from 6 to 13% of $Al_2O_3$, from 1 to 5% of MgO, from 3 to 10% of CaO, from 10 to 17% of SrO, from 1 to 8% of BaO, from 25 to 29% of MgO+CaO+SrO+BaO, from 6 to 12% of $Na_2O+K_2O+Li_2O$, from 0 to 4% of $ZrO_2$ and from 0.01 to less than 1% of $SO_3$.

Further, the most preferred composition of the substrate glass of the present invention consists essentially of, as represented by mass % based on oxide, from 55 to 59% of $SiO_2$, from 6 to 9% of $Al_2O_3$, from 2 to 5% of MgO, from 3 to 6% of CaO, from 10 to 15% of SrO, from 1.5 to 6% of BaO, from 25 to 27% of MgO+CaO+SrO+BaO, from 6 to 10% of $Na_2O+K_2O+Li_2O$, from 0 to 2% of $ZrO_2$ and from 0.01 to 0.6% of $SO_3$.

In addition to the above components, the substrate glass of the present invention may contain $Sb_2O_3$, $P_2O_5$, F and Cl up to 2% in the total amount in order to improve the melting property, the clarifying property and the forming property of the glass.

Further, in order to improve the durability of the substrate glass, $La_2O_3$, $TiO_2$, $SnO_2$ and ZnO may be contained up to 5% in the total amount.

Further, in order to adjust the color tone of the substrate glass, a colorant such as $Fe_2O_3$, CoO, NiO or $Nd_2O_3$ may be contained. The total content of such colorants is preferably at most 1%.

Further, in order to improve the melting property, $B_2O_3$ may be contained. However, if an excess amount of $B_2O_3$ is contained, the thermal expansion coefficient of the substrate glass becomes too low. Therefore, the content of $B_2O_3$ is preferably less than 1.5%.

The high temperature viscosity of the substrate glass of the present invention is lower than that of conventional glass for a PDP substrate. Specifically, the temperature of glass melt corresponding to the viscosity of $10^2$ dPa·s is at most 1,520° C., and the temperature of glass melt corresponding to the viscosity of $10^4$ dPa·s is at most 1,120° C.

The viscosity of $10^2$ dPa·s is the standard viscosity which shows that the viscosity of glass melt is sufficiently low in the glass melting step. Accordingly, the temperature of glass melt corresponding to the viscosity of $10^2$ dPa·s is the standard temperature of glass melt in the melting step.

In the case of conventional substrate glass for PDP, the temperature of glass melt corresponding to the viscosity of $10^2$ dPa·s (hereinafter referred to as T(log η=2)) exceeds 1,520° C. Since in the case of the glass substrate of the present invention, T(log η=2) is at most 1,520° C., the melting step can be carried out at a lower temperature than conventional melting steps. Consequently, the stable production of glass can be realized. Further, since the temperature of a melting bath in the melting step becomes low, the life span of the melting bath extends. Since the amount of fuel to be consumed in the melting step can be reduced, the production cost of glass can be reduced.

T(log η=2) is more preferably at most 1,510° C.

The viscosity of $10^4$ dPa·s is the standard viscosity at the time of float forming of glass. Accordingly, the temperature of glass melt corresponding to the viscosity of $10^4$ dPa·s is the standard temperature of the glass melt in the float forming process.

In the case of conventional glass for a PDP substrate, the temperature of glass melt corresponding to the viscosity of $10^4$ dPa·s (hereinafter may sometimes be referred to as T(log η=4)) exceeds 1,120° C. Since in the case of the glass substrate of the present invention, T(log η=4) is at most 1,120° C., the float forming process can be carried out at a lower temperature than conventional float forming processes. Consequently, the stable production of glass can be realized. Further, the life span of a float bath extends. Since the amount of heat required for heating the float bath can be reduced, the production cost of a substrate glass can be reduced. Further, the temperature of glass ribbons pulled out from the float bath is lowered, energy required for a slowly cooling step subsequent to the float forming can be reduced.

Further, by lowering the temperature of the float forming step, tin defects of the substrate glass to be obtained can be reduced. If the temperature of the float forming step is high, the temperature in the float bath, particularly the temperature of molten tin becomes high. As a result, the evaporation amount of molten tin increases. The evaporated molten tin is condensed in the vicinity of the ceiling and falls on glass ribbons, and tin defects are formed.

By lowering the temperature of the float forming step, the temperature in the float bath, particularly the temperature of molten tin can be lowered. As a result, the evaporation amount of molten tin can be reduced, and tin defects of the substrate glass due to evaporated molten tin can be reduced.

T(log η=4)) is preferably at most 1,110° C., more preferably at most 1,100° C.

The glass transition temperature (Tg) of the substrate glass of the present invention is at least 610° C. If the glass transition temperature is lower than 610° C., in the case of producing large size PDP such as so called 40-inch, the amount of glass shrinkage by the heat treatment cannot be sufficiently small.

Tg of the substrate glass of the present invention is preferably at least 615° C., more preferably at least 620° C.

The specific gravity of the substrate glass of the present invention is at most 2.9. If the specific gravity exceeds 2.9, the substrate glass is heavy, which is not preferred for handling, particularly for transporting the glass. The specific gravity of the substrate glass being at most 2.9 is a particularly important factor for large size substrate glasses.

The specific gravity of the substrate glass of the present invention is preferably at most 2.85, more preferably at most 2.8.

The thermal expansion coefficient of the substrate glass of the present invention is preferably within the range of from $80 \times 10^{-7}/°C$ to $90 \times 10^{-7}/°C$. In a case where the substrate glass of the present invention is used for PDP, it is necessary to use a frit material and a paste material used for producing PDP, of which the thermal expansion coefficient corresponds to that of the substrate glass. In the temperature range of the firing step carried out for producing PDP, it is very difficult to select one without the above range of the thermal expansion coefficient.

The thermal expansion coefficient of the substrate glass of the present invention is more preferably within the range of from $82 \times 10^{-7}/°C$ to $84 \times 10^{-7}/°C$.

The volume resistivity of the substrate glass of the present invention is preferably at least $1 \times 10^{11} \Omega \cdot cm$ at $150°C$. At the time of producing PDP, silver electrodes are formed on a surface of the substrate glass. It is preferred that the substrate glass is excellent in an insulating property in order to prevent a part of conducted current from leaking to glass around the silver electrodes, when electricity is conducted on the silver electrodes. When the volume resistivity of the glass is at least $1 \times 10^{11} \Omega \cdot cm$ at $150°C$, the substrate glass is excellent in the insulating property, and therefore, in the case of making PDP be large size and high density, when electricity is conducted on silver electrodes formed on the substrate glass, it is possible to prevent a part of conducted current from leaking to glass around the silver electrodes.

In a case where the composition of glass for PDP substrates is selected only by paying attention to lowering the high temperature viscosity, it is impossible to make the volume resistivity of the glass be at least $1 \times 10^{11} \Omega \cdot cm$ at $150°C$. In order to raise the high temperature viscosity, at least one content of the glass compositions of $SiO_2$, MgO, CaO, SrO and BaO is increased. However, if the content of $SiO_2$ is increased, the volume resistivity of the glass at $150°C$ is much less than $1 \times 10^{11} \Omega \cdot cm$.

In the case of the substrate glass of the present invention, while maintaining the volume resistivity of the glass to be at least $1 \times 10^{11} \Omega \cdot cm$ at $150°C$, the high temperature viscosity of the glass can be lowered.

The volume resistivity of the substrate glass of the present invention at $150°C$ is preferably at least $2 \times 10^{11} \Omega \cdot cm$, more preferably at least $5 \times 10^{11} \Omega \cdot cm$.

The substrate glass of the present invention is preferred as a substrate glass for a display, particularly a glass for PDP substrate. The spectral transmittance of the substrate glass of the present invention is preferably at least 85% in each range of from 425 to 475 nm, from 510 to 560 nm and 600 to 650 nm.

Further, in a case where the substrate glass of the present invention is used as the glass for PDP substrate, its thickness is preferably from 0.3 mm to 3.0 mm.

In a case where the substrate glass of the present invention is produced, in the same order as conventional methods for producing substrate glass for PDP, respective steps which are carried out for producing glass, namely a melting step, clarification step and float forming step may be carried out.

In the melting step, materials of respective components of the substrate glass are prepared so as to be the desired components, and they are continuously added to a melting bath, followed by heating to melt glass. In the melting step, the glass is heated to melt, until the temperature of glass melt reaches about $T(\log \eta = 2) + 100°C$.

In general, the effect of the clarification step, namely the bubble removing efficiency from the glass melt becomes high, as the temperature of the clarification step is increased. However, if the temperature of the clarification step is increased, the amount of fuel to be consumed for the clarification step increases proportionally, and as a result, the production cost of is the substrate glass becomes high. Therefore, the temperature of the clarification step is decided by taking the effect of the clarification step and the production cost of the substrate glass into consideration.

In the clarification step, one of the important parameters is the floating velocity of bubbles in glass melt.

The floating velocity of bubbles in glass melt is represented by the following formula.

$$v = 2r^2 \cdot g \cdot (d-d')/9\eta$$

In the formula, v is the floating velocity (cm/hr) of bubbles, r is the radius (μm) of bubbles, d is the specific gravity of glass, d' is the specific gravity of bubbles, and η is the viscosity (dPa·s) of glass.

Accordingly, in order to raise the floating velocity of bubbles in glass melt, the radius r of bubbles is increased, the viscosity η of glass melt is lowered, or both of them are carried out.

It is known that the viscosity η of glass logarithmically decreases, as the temperature of the glass increases. On the other hand, as shown in FIG. 1, the radius r of bubbles hardly changes at first, even though the temperature of glass melt is raised, and it rapidly increases when the temperature of glass melt reaches a certain temperature (the foam growth starting temperature). Its reason is considered as that once the temperature of glass melt reaches the foam growth starting temperature, the decomposition of $SO_3$ added to a glass material as a clarifier starts in the glass melt, and the radius r of bubbles rapidly increases by $SO_2$ thereby generated.

As shown in FIG. 1, the foam growth starting temperature of the substrate glass of the present invention is lower than that of conventional substrate glass for PDP (Examples 6 and 7). Therefore, in a case where the substrate glass of the present invention is produced, the clarification step can be carried out at a lower temperature, as compared to the production of conventional glass for PDP.

The reason why the foam growth starting temperature of the substrate glass of the present invention is lower than that of conventional glass for PDP is not clear. However, it is considered as that the total amount of MgO, CaO, SrO and BaO being higher than conventional glass for PDP is influential.

Further, among MgO, CaO, SrO and BaO, increasing the total amount of MgO, CaO and SrO is effective to lower the foam growth starting temperature. In a case where it is an object to lower the foam growth starting temperature, the total amount of MgO, CaO and SrO is preferably from 15 to 30%, more preferably from 18 to 28%, further preferably from 19 to 26%.

In a case where the glass substrate of the present invention is produced, it is preferred to carry out a clarification step at a temperature in the vicinity of the foam growth starting temperature, since both the effect of the clarification step and the production cost of the substrate glass are excellent. Specifically, the clarification step is preferably carried out within the range of the foam growth starting temperature $+300°C$, and the clarification step is more preferably carried out within the range of the foam growth starting temperature $+250°C$.

The foam growth starting temperature of the substrate glass of the present invention is preferably lower than $1,420°C$, more preferably at most $1,410°C$, particularly preferably at most $1,400°C$.

If after materials are added in a melting furnace, the decomposition of $SO_3$ starts at an initial stage of melting glass (vitrification reaction stage), the foam growth in the subsequent clarification step is insufficient. Therefore, the foam growth starting temperature is preferably at least 1,250° C., more preferably at least 1,300° C., further preferably at least 1,350° C.

In a case of producing the substrate glass of the present invention, the $SO_3$ source to be added in the glass material as a clarifier is preferably from 0.1 to 5%, more preferably from 0.1 to 4%, further preferably from 0.1 to 3%, as calculated as $SO_3$, based on the total 100% of the material.

In the float forming step, the molten glass of which bubbles are removed in the clarification step is transferred to the float step at the temperature in the vicinity of temperature T(log η=4) of the molten glass and float-formed into a predetermined plate thickness. For example, the float forming is carried out between the upstream side temperature T(log η=4)+20° C. and the down stream side temperature T(log η=4)−520° C.

After the float forming, glass ribbons pulled out from the float bath is slowly cooled in a cooling furnace. Then, the glass ribbons are cut into a predetermined size, and the substrate glass of the present invention is obtained.

EXAMPLES

Now, the present invention will be described in further detail with reference to Examples. However, the present invention is by no means restricted to such specific Examples.

Table 1 shows glass compositions (mass %) of Examples 1 to 5 (Examples of the present invention), Table 2 shows glass compositions of Examples 6 to 11 (Comparative Examples), and Table 3 shows glass compositions of Examples 12 to 16 (Examples of the present invention).

Materials of respective components were prepared so as to be the desired composition, and heated and melted in a platinum crucible at a temperature of from 1,500 to 1,600° C. for 4 hours. At the time of melting the glass, a platinum stirrer was inserted, and the molten glass was stirred for 2 hours to homogenize the glass. Then, the glass melt was cast, annealed and then polished to obtain a glass plate having a thickness of 2.8 mm.

With respect to the glass thus obtained, the glass composition (unit: mass %), the thermal expansion coefficient (α, unit: $10^{-7}$/° C.), the glass transition temperature (Tg, unit: ° C.), the volume resistivity at 150° C. (log η, unit: Ωcm), T(log η=2) (unit: ° C.) and T(log η=4) (unit: ° C.) were measured. Further, calculated values are shown in "( )" in Tables. The results are shown in Tables 1, 2 and 3.

The glass transition temperature was obtained as follows. The glass was held at the temperature of the annealing point for 30 minutes, followed by annealing at a cooling rate of 60° C./minute. Then, with respect to the annealed glass, a thermal expansion curve of from room temperature to a distortion point was obtained by using a differential thermal dilatometer. Tangent lines were drawn at before and after a point of a first curve, the temperature corresponding to an intersection of the tangent lines was determined as the glass transition temperature.

Further, the foam growth starting temperature of the obtained glass was measured by the following method. Materials of respective components were prepared so as to be the desired composition, and heated and melted in a platinum crucible at a temperature of from 1,300 to 1,450° C. for about 6 hours. At the time of melting the glass, a platinum stirrer was inserted, and the molten glass was stirred for 3 hours. The glass melt was transferred to a quartz cell, and the temperature of the glass melt was changed between 1,300° C. and about 1,525° C. to measure the diameter of bubbles (at least 20 bubbles) in the glass melt. Based on the result of the measurement, the average diameter (μm) of bubbles in the glass melt was calculated.

FIG. 1 shows the plot of the relationship between the temperature of the glass melt and logarithmic values of the average diameter of bubbles. The temperature at a part where the obtained line remarkably changes was taken as the foam growth starting temperature (° C.). The results are shown in Tables 1, 2 and 3.

TABLE 1

|  | Ex. 1 | Ex. 2 | Ex. 3 | Ex. 4 | Ex. 5 |
|---|---|---|---|---|---|
| $SiO_2$ | 56.0 | 55.0 | 55.3 | 57.2 | 53.7 |
| $Al_2O_3$ | 8.3 | 8.8 | 8.7 | 8.0 | 8.6 |
| MgO | 3.7 | 3.5 | 3.5 | 3.2 | 2.8 |
| CaO | 5.0 | 4.5 | 4.9 | 4.5 | 4.0 |
| SrO | 16.9 | 9.7 | 14.4 | 13.9 | 9.5 |
| BaO | 1.8 | 10.0 | 4.9 | 3.6 | 13.0 |
| $Na_2O$ | 5.1 | 4.9 | 5.0 | 4.6 | 4.8 |
| $K_2O$ | 2.8 | 2.7 | 2.8 | 4.2 | 2.7 |
| $ZrO_2$ | 0.4 | 0.9 | 0.4 | 0.9 | 0.9 |
| MgO + CaO + SrO + BaO | 27.4 | 27.7 | 27.9 | 25.2 | 29.3 |
| $Na_2O + K_2O$ | 7.9 | 7.6 | 7.8 | 8.7 | 7.5 |
| MgO + CaO + SrO | 25.6 | 17.7 | 22.9 | 21.6 | 16.3 |
| $SO_3$ | 0.1 | 0.1 | 0.1 | 0.1 | 0.1 |
| α [$10^{-7}$/° C.] | 83 | (83) 84 | 83 | 82 | 83 |
| Tg [° C.] | 634 | (633) 641 | 638 | 639 | 635 |
| ρ [Ωcm] | $10^{12.1}$ | $10^{12.1}$ | $10^{12.4}$ | $10^{12.1}$ | $10^{12.6}$ |
| T(log η = 2) [° C.] | 1495 | (1505) 1480 | 1452 | 1487 | (1501) 1471 |
| T(log η = 4) [° C.] | 1082 | (1086) 1106 | 1082 | 1109 | (1078) 1100 |
| Specific gravity | 2.81 | 2.84 | 2.84 | 2.78 | 2.89 |
| Foam growth starting temp. [° C.] | 1380 | 1380 | 1390 | 1400 | 1400 |

TABLE 2

|  | Ex. 6 | Ex. 7 | Ex. 8 | Ex. 9 | Ex. 10 | Ex. 11 |
|---|---|---|---|---|---|---|
| $SiO_2$ | 57.7 | 62.6 | 60.9 | 54.1 | 60.2 | 64.0 |
| $Al_2O_3$ | 6.9 | 4.8 | 9.5 | 6.5 | 8.0 | 5.0 |
| MgO | 2.0 | 4.9 | 5.0 | 0.8 | 0.0 | 0.0 |
| CaO | 5.0 | 7.3 | 6.1 | 4.7 | 10.0 | 9.0 |
| SrO | 7.1 | 3.2 | 1.6 | 6.6 | 3.0 | 5.0 |
| BaO | 8.0 | 0.0 | 0.0 | 12.7 | 6.6 | 4.0 |
| $Na_2O$ | 4.3 | 2.4 | 2.5 | 4.9 | 6.0 | 10.0 |
| $K_2O$ | 6.0 | 12.8 | 4.9 | 4.3 | 4.0 | 1.0 |
| $ZrO_2$ | 3.0 | 1.9 | 9.5 | 5.3 | 2.0 | 1.8 |
| MgO + CaO + SrO + BaO | 22.1 | 15.4 | 12.7 | 24.8 | 19.6 | 18.0 |
| $Na_2O + K_2O$ | 10.3 | 15.2 | 7.4 | 9.2 | 10.0 | 11.0 |
| MgO + CaO + SrO | 14.1 | 15.4 | 12.7 | 12.1 | 13.0 | 14.0 |
| $SO_3$ | 0.1 | 0.3 | 0.2 | (0.2) 0.1 | 0.2 | 0.2 |
| α [$10^{-7}$/° C.] | 83 | 83 | 83 | 82 | 82 | 87 |
| Tg [° C.] | 625 | 632 | 645 | 635 | 626 | 576 |
| ρ [Ω·cm] | $10^{12.0}$ | $10^{12.3}$ | $10^{10.8}$ | $10^{12.5}$ | $10^{11.2}$ | $10^{8.1}$ |
| T(log η = 2) [° C.] | 1551 | 1545 | 1599 | 1480 | 1503 | 1430 |
| T(log η = 4) [° C.] | 1141 | 1151 | 1178 | 1155 | 1145 | 1073 |
| Specific gravity | 2.77 | 2.56 | 2.55 | 2.91 | 2.71 | 2.64 |
| Foam growth starting temp. [° C.] | 1420 | 1440 | 1430 | 1430 | 1430 | 1430 |

TABLE 3

|  | Ex. 12 | Ex. 13 | Ex. 14 | Ex. 15 | Ex. 16 |
|---|---|---|---|---|---|
| $SiO_2$ | 57.5 | 57.2 | 58.1 | 56.0 | 55.3 |
| $Al_2O_3$ | 7.4 | 7.4 | 6.7 | 6.6 | 6.3 |
| MgO | 4.0 | 5.5 | 3.8 | 7.3 | 8.7 |
| CaO | 3.3 | 3.3 | 4.1 | 3.4 | 3.4 |
| SrO | 13.8 | 9.2 | 14.0 | 13.9 | 13.9 |
| BaO | 4.8 | 7.4 | 3.9 | 3.2 | 2.6 |
| $Na_2O$ | 4.8 | 4.8 | 4.9 | 3.6 | 3.1 |
| $K_2O$ | 4.3 | 4.5 | 3.9 | 5.6 | 6.1 |
| $ZrO_2$ | 0.2 | 0.9 | 0.7 | 0.4 | 0.5 |
| MgO + CaO + SrO + BaO | 25.9 | 25.3 | 25.7 | 27.8 | 28.7 |
| $Na_2O + K_2O$ | 9.1 | 9.3 | 8.8 | 9.2 | 9.2 |
| MgO + CaO + SrO | 21.1 | 17.9 | 21.9 | 24.6 | 26.1 |
| $SO_3$ | 0.1 | 0.1 | 0.1 | 0.1 | 0.1 |
| α [$10^{-7}$/° C.] | 83 | 83 | 83 | 82 | 81 |
| Tg [° C.] | 625 | 629 | 627 | 637 | 642 |
| ρ [Ω·cm] | $10^{12.2}$ | $10^{12.3}$ | $10^{12.2}$ | $10^{12.8}$ | $10^{13.0}$ |
| T(log η = 2) [° C.] | 1486 | 1498 | 1474 | 1439 | 1419 |
| T(log η = 4) [° C.] | 1100 | 1112 | 1093 | 1086 | 1081 |
| Specific gravity | 2.78 | 2.76 | 2.78 | 2.79 | 2.79 |
| Foam growth starting temp. [° C.] | 1400 | 1400 | 1400 | 1400 | 1400 |

From the results shown in Tables 1, 2 and 3, it is evident that the thermal expansion coefficient of the substrate glass of the present invention (Examples 1 to 5 and Examples 12 to 16) is within the range of from $80 \times 10^{-7}$/° C. to $90 \times 10^{-7}$/° C., which is substantially equivalent to the thermal expansion coefficient of conventional soda lime silica glass (Examples 6 to 11) which is used as glass for PDP substrate.

Further, each of the substrate glass of the present invention (Examples 1 to 5 and Examples 12 to 16) has the glass transition temperature of at least 610° C. Therefore, the substrate glass of the present invention is free from a problem such that glass shrinks in the production of a large size PDP such as so called 40-inch.

Further, each of the substrate glass of the present invention (Examples 1 to 5 and Examples 12 to 16) has a volume resistivity of at least $1 \times 10^{11}$ Ω·cm at 150° C., whereby in a case where the size of PDP is increased, or density of PDP is highly increased, at a time of charging silver electrodes formed on the substrate glass with electricity, it is possible to prevent a part of current from leaking to glass around the silver electrodes.

In the case of the glass composition (Example 11) prepared only by paying attention to lowering the high temperature viscosity, although T(log η=2) and T(log η=4) were lowered, the volume resistivity was remarkably lower than $1 \times 10^{11}$ Ω·cm at 150° C.

Of the substrate glass of the present invention (Examples 1 to 5 and Examples 12 to 16), T(log η=2), which is the standard temperature of the melting step, the foam growth starting temperature, which is the standard temperature of the clarification step and T(log η=4), which is the standard temperature of the float forming step are lower than those of the conventional soda lime silica glass for PDP (Examples 6 to 11) respectively, whereby the production steps of the substrate glass can be carried out at a lower temperature than the conventional soda lime silica glass for PDP.

INDUSTRIAL APPLICABILITY

The substrate glass of the present invention is very useful as a glass for a display substrate, particularly a glass for a plasma display panel substrate.

The entire disclosure of Japanese Patent Application No. 2006-131971 filed on May 10, 2006 including specification, claims and summary is incorporated herein by reference in its entirety.

What is claimed is:

1. A float glass for a display substrate, characterized in that its composition consists essentially of, as represented by mass % based on oxide,
   from 52 to 62% of $SiO_2$,
   from 5 to 15% of $Al_2O_3$,
   from more than 0% to 9% of MgO,
   from 3 to 12% of CaO,
   from 9 to 18% of SrO,
   from 2.6 to 13% of BaO,
   from 25.2 to 30% of MgO+CaO+SrO+BaO, from 6 to 14% of $Na_2O+K_2O+Li_2O$,
from 0 to 6% of $ZrO_2$ and
from 0 to 1% of $SO_3$,
the temperature of glass melt corresponding to the viscosity of $10^2$ dPa·s is at most 1,520° C.,
the temperature of glass melt corresponding to the viscosity of $10^4$ dPa·s is at most 1,120° C.,
the glass transition temperature is at least 610° C., and
the specific gravity is at most 2.9.

2. The float glass for a display substrate according to claim 1, which contains from more than 0% to at most 5% of MgO, as represented by mass % based on oxide.

3. The float glass for a display substrate according to claim 1, which contains from at least 0.001% to less than 1% of $SO_3$, as represented by mass % based on oxide.

4. The float glass for a display substrate according to claim 1, wherein the foam growth starting temperature in the glass melt is lower than 1,420° C.

5. The float glass for a display substrate according to claim 1, wherein the thermal expansion coefficient is within the range of from $80\times10^{-7}$/° C. to $90\times10^{-7}$/° C.

6. The float glass for a display substrate according to claim 1, wherein the volume resistivity of the glass is at least $1\times10^{11}$ Ω·cm at 150° C.

7. The float glass according to claim 1, wherein the foam growth starting temperature in the glass melt is more than 1,400° C.

8. The float glass according to claim 1, wherein the SrO is present in an amount of from 10 to 17% by mass, and the temperature of the glass melt corresponding to the viscosity of $10^2$ dPa·s is at most 1,495° C.

9. The float glass for a display substrate according to claim 1, wherein the temperature of the glass melt corresponding to the viscosity of $10^2$ dPa·s is at most 1,495° C.

10. A method for producing a float glass for a display substrate, characterized in that a glass material is prepared so as to be the glass as defined in claim 1, and the glass material is then melted and formed into a plate glass by a float process.

* * * * *